United States Patent

[11] 3,542,057

[72] Inventor Louis T. Staiano
 729-48th St., Brooklyn, New York 11220
[21] Appl. No. 782,506
[22] Filed Nov. 4, 1968
[45] Patented Nov. 24, 1970

[54] DRAIN PLUG VALVE FOR SUMPS
 10 Claims, 12 Drawing Figs.
[52] U.S. Cl. .................................................. 137/328,
 137/454.5, 137/515.3, 137/541, 137/542
[51] Int. Cl. .................................................. F16k 15/06
[50] Field of Search ........................................ 137/247.5,
 316, 327, 328, 454.5, 515.3, 541, 542

[56] References Cited
UNITED STATES PATENTS
558,355 4/1896 Colwell ...................... 137/315
1,659,478 2/1928 Black ........................ 137/454.5X Primary Examiner—Harold W. Weakley
Attorney—Polachek and Saulsbury ABSTRACT: A valve assembly has a cylindrical casing which can be screwed into a threaded drain opening or trap. A movable valve member in the casing is held closed by a spring which is adjustable in tension. The valve member seals a transverse apertured partition in the casing, but opens when water enters the top of the casing and passes through the holes in the partition to the valve member. Inverted T-slots in the open top of the casing can be engaged by a tool for removing the casing. The partition can be removable for removing the valve member without disturbing the casing.

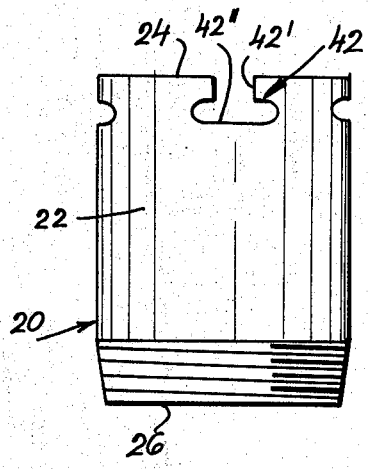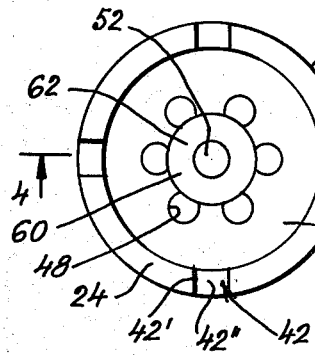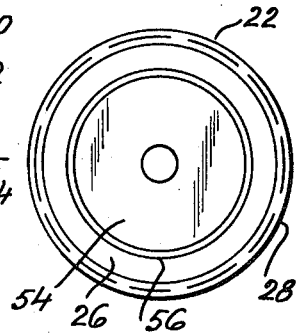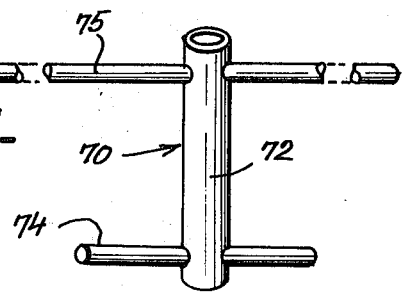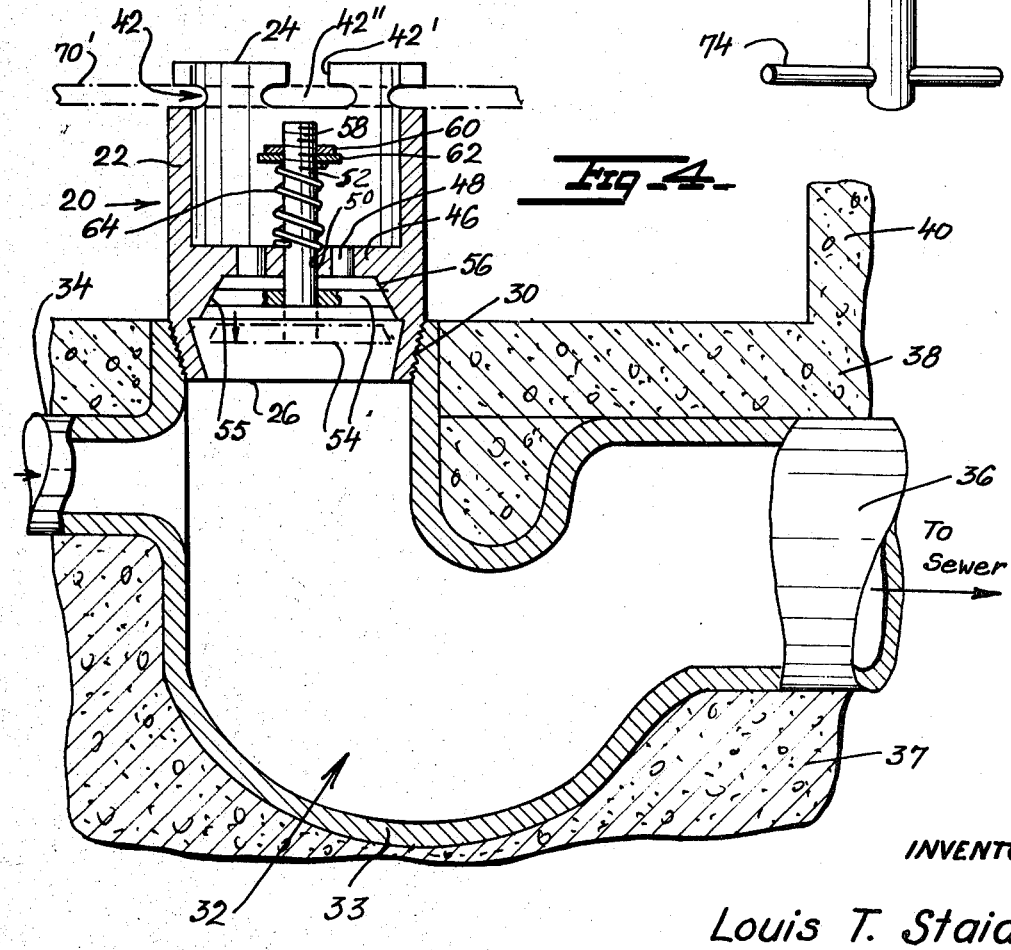
INVENTOR
Louis T. Staiano
BY Polachek & Saulsbury
ATTORNEYS

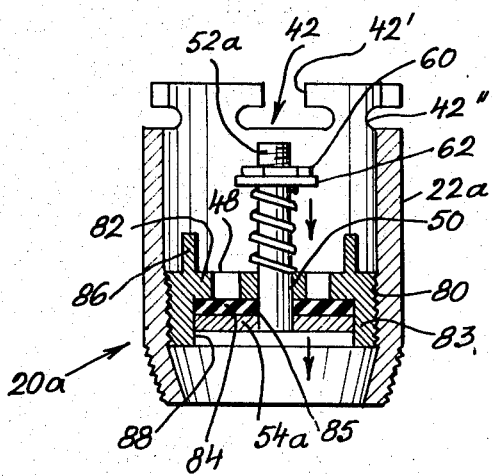
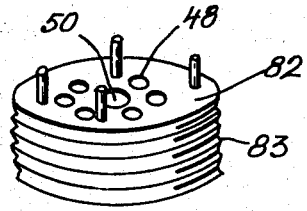
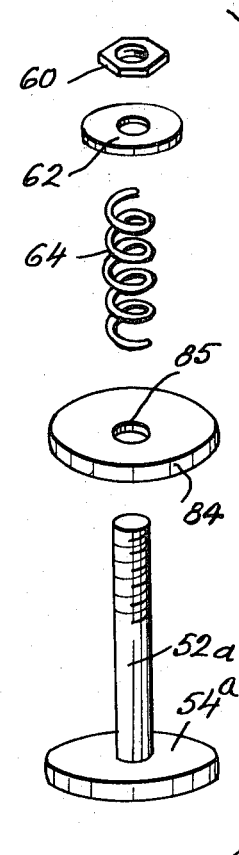

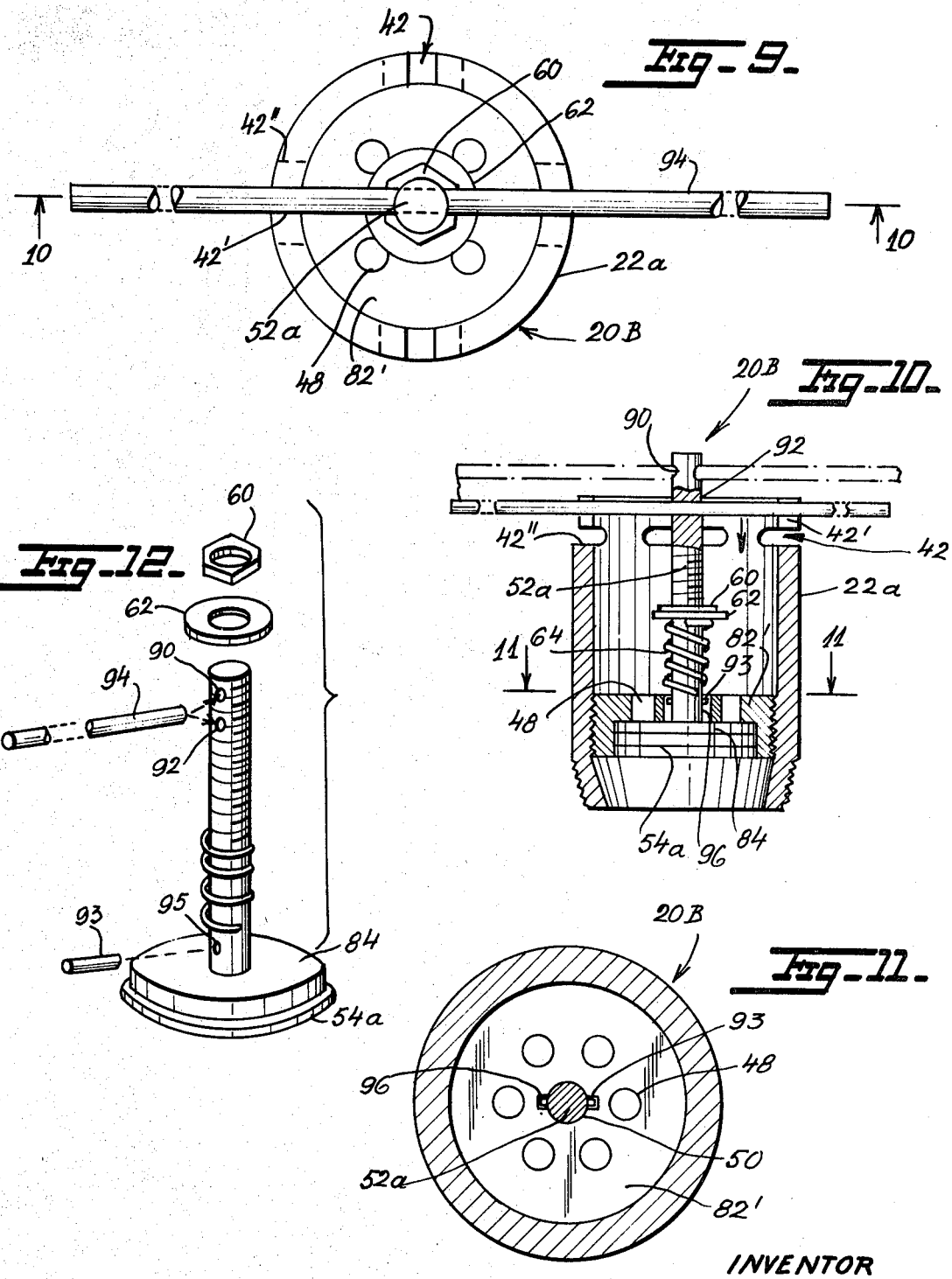

DRAIN PLUG VALVE FOR SUMPS

The present invention concerns a valve assembly for drain conduits. Heretofore, valve assemblies employed for drain traps and sumps have presented considerable difficulties in use. If the valve assembly becomes jammed or clogged, it cannot be removed quickly to relieve a flooding condition. Some sumps have drain plugs which are soldered in place and cannot be removed without use of a blow torch. Some valve assemblies employ ball valves which cannot be removed for cleaning.

The present invention involves a drain plug valve assembly which can be substituted in place of drain plugs of conventional type. The present valve assembly can be easily installed and removed by means of a simple tool such as a rigid rod or bar, a T-bar wrench and the like. The valve assembly has a spring loaded movable valve plate which opens and closes readily in response to pressure applied above and below. The valve is arranged so that backwash and foul odors are prevented from leaving a drain and entering the basement or cellar of a building.

The invention provides a measure of safety in preventing flooding of basements due to bursting sewer and drain pipes. It will prevent flooding due to bursting water pipes, water storage tanks and other apparatus utilizing water inside a building. It will prevent flooding due to clogged exterior drains which cause drain water to be diverted into cellars and basements. The invention will also help prevent flooding from ground water seepage through foundations.

The present valve assembly can be manufactured at relatively low cost. It is relatively simple in construction, reliable in operation, and versatile in the range of applications in which it can be employed.

Various objects, features and advantages of the invention will become apparent upon reading the following specification together with the accompanying drawing forming a part thereof.

Referring to the drawing:

FIG. 1 is a side view of a plug valve assembly embodying the invention;

FIGS. 2 and 3 are top and bottom plan views, respectively, of the valve assembly of FIG. 1;

FIG. 4 is a vertical sectional view taken on line 4—4 of FIG. 2 showing the valve assembly installed in a sump at the head of a drain trap;

FIG. 5 is a perspective view of a wrench which can be used in installing and removing the valve assembly;

FIG. 6 is a vertical central sectional view of another valve assembly embodying another form of the invention;

FIG. 7 is an exploded perspective view of parts of the valve assembly of FIG. 6;

FIG. 8 is a perspective view of an abutment and strainer plate employed in the valve assembly of FIG. 6;

FIG. 9 is a top plan view of a valve assembly embodying a further form of the invention;

FIG. 10 is a reduced vertical sectional view taken on line 10—10 of FIG. 9;

FIG. 11 is a cross-sectional view on the same scale as FIG. 9 taken on line 11—11 of FIG. 10; and FIG. 12 is an exploded perspective view of parts of the assembly of FIGS. 9—11.

Referring first to FIGS. 1—4, there is shown a valve assembly 20 including an axially vertical cylindrical shell or casing 22 open at its top and bottom ends 24, 26. The bottom end is formed with external tapered threading 28 so that the casing can be snugly screwed into the internally threaded opening 30 of a drain 32. This drain may include a trap 33, soil pipe inlet 34 and sewer pipe outlet 36 all set in the ground 37 underneath the floor 38 of a basement. The casing 22 can extend upwardly in a well or sump 40.

Exposed at the top of the casing are two pairs of diametrically opposed inverted T-slots 42 used when the assembly is being installed and removed at drain opening 30. A wrench 45, as shown in FIG. 5, can be used for this purpose as explained further below.

A partition 46 extends transversely across the inside of the casing and is integral therewith. This partition has a plurality of circumferentially spaced holes 48 through which drain water can pass. Partition 46 has a central hole 50 in which is slidably disposed an axially vertical shaft 52. Secured to the bottom end of the shaft is a valve plate 54 formed with a beveled edge 55 to fit snugly in conical valve seat 56 formed in the wall of casing 22. The upper end of shaft 52 has threading 58 on which is engaged a nut 60. Under the nut is a flat washer 62. Between the washer and upper side of plate 46 is a coil spring 64 engaged on shaft 52. The spring can be adjustably compressed by adjustment of nut 60. Normally, the valve plate 54 will be held in the closed position shown in FIG. 4 by the tension in spring 64. This prevents any foul odors or backwash from seeping upwardly pass plate 54 and through holes 48 in partition 46 to the basement where the assembly is located. If the backwash water exerts considerable pressure on the underside of valve plate 54, this will only close the valve more securely against the valve seat 56.

The coil spring 64 is so tensioned that if any drain water enters the upper end of the casing 22 due to flooding of the basement or sump, the weight of water will push down the valve plate to the dotted line position shown in FIG. 4 so that the water will drain through holes 48 in plate 46 into the trap.

A wrench 70, as shown in FIG. 5, can be used for quick and easy installation of the valve assembly and for removing the valve assembly for cleaning. The wrench has a straight shank 72. At the lower end is a crossbar 74 and at the upper end is a handle bar 75. The crossbar can be inserted through the upper portions 42' of two diametrically opposed slots 42 down to cross portions 42". Then the wrench can be turned in one direction or the other to lock the crossbar in undercut ends of cross portions 42". Considerable pressure downward or pull upward can be exerted on the wrench while screwing the valve assembly into the drain opening 30 or while removing the valve assembly from the opening. If wrench 70 is not available, any long straight rigid bar 70' can be inserted in a pair of slots 42 as indicated by dotted lines in FIG. 4 for turning the valve casing 22 to install or remove it. However, use of T-bar wrench as shown is preferred.

FIGS. 6—8 show another valve assembly 20A in which parts corresponding to those of assembly 20 are identically numbered. In assembly 20A, casing 22a is formed with internal threading 80 on which is removably engaged cup-shaped abutment and strainer partition 82. This has an externally threaded cylindrical skirt 83 engaging threading 80. On the bottom end of vertically movable shaft 52a is a flat-valve plate 54a on which is a resilient valve pad 84. The pad has a central hole 85 to fit on the shaft as shown in FIG. 6 and FIG. 7. The pad 84 is held normally in abutment with the flat underside of partition 82 to close holes 48. A plurality of pegs or posts 86 can be integrally formed with or secured in the top of partition 82. These posts can be gripped manually or by a suitable wrench for removing partition 82 or for replacing it in the casing. The valve plate 54a and pad 84 are disposed in the cylindrical recess 88 at the underside of plate 54a.

Valve assembly 20A operates like valve assembly 20 and can be installed in place of this valve assembly. Valve assembly 20A has the desirable feature that the valve plate 54a along with shaft 52a, spring 64, valve plate 82 and pad 84 can all be easily removed as a unit leaving the casing 22a in place. If removal of housing 22a is desired, then wrench 70 can be used. If this wrench is not available, any straight rigid rod or bar can be engaged in slots 42 and used to remove the entire valve assembly from drain opening 30.

FIGS. 9—12 show a further valve assembly 20B in which parts corresponding to those of assemblies 20 and 20A are identically numbered. In valve assembly 20B, shaft 52a extends axially above the top of casing 22a. Upper and lower diametral holes 90, 92 are formed in shaft 52a. A long crossbar 94 is insertable in diametral hole 92 below hole 90. Bar 94 is normally disposed in upper portions 42' of T-shaped holes 42. This bar can move down as far as the bottoms of slot portions 42" when the valve is opened by pressure of water on pad 84 and valve plate 54a. A cross pin or key 93 can be inserted in transverse hole 95 in shaft 52a near plate 54a just above pad 84. This key moves in radial slots 96 formed in diametrically opposed positions at hole 50 in partition 82' and prevents shaft 52a from turning in the partition.

The valve plate 54a and pad 84 are normally held closed by coil spring 64 in the same manner as in valve assembly 20A. Any pressure exerted below plate 54a will force pad 84 up more tightly against the underside of partition 82' to close holes 48 more tightly. If removal of the entire valve assembly is desired, the bar 94 can be pushed down to slot portions 42" and can be turned to loosen casing 22a. The engagement of bar 94 in upper slot portions 42' serves to prevent partition 82' from becoming loose in housing 22a. It also cooperates with key 93 to prevent shaft 52a from turning. This keeps pad 84 in a set position on plate 52a so that once a good seal is established with holes 48, this seal is not lost by inadvertent turning of the pad. Pad 84 can be cemented in place on plate 54a if desired.

If removal of partition 82' along with the shaft, spring and other valve members in casing 22a is desired, bar 94 can be pulled out of hole 92, inserted in hole 90 and turned to loosen partition 82'. Turning in reverse direction will set partition 82' in place in the casing 22a. Valve assembly 20B has the advantage that the bar which is used to remove the entire assembly can also be used to remove the interior parts without disturbing the casing 22a. Furthermore, the bar serves the useful purposes of preventing the partition 82 from becoming loose and of maintaining the set of pad 84.

In all forms of the invention, the valve assemblies are made of strong, long wearing replaceable parts. They can be manufactured at relatively low cost by mass production metal working machinery.

I claim:

1. A valve assembly comprising a generally cylindrical axially vertical casing open at top and bottom ends to permit passage of water therethrough, said casing being externally threaded for engagement in and removal from a threaded drain opening; a circular partition transversely disposed inside said casing, said partition having a plurality of circumferentially spaced holes for passing drain water therethrough; a shaft disposed axially in said casing and slidably disposed in a central aperture in said partition; a flat-valve plate secured to said shaft at its lower end under said partition; a coil spring on the shaft bearing at its lower end on said partition; a nut and washer on an upper portion of the shaft engaging the upper end of the spring to tension the same for holding the valve plate in a closed seated position under the partition; and inverted T-shaped diametrically opposed slots formed in the top of the casing for engagement of a rigid bar therein to facilitate turning the casing to install it in said drain opening and to remove it from the drain opening.

2. A valve assembly as defined by claim 1, wherein said partition is externally threaded and is removably engaged in an internally threaded portion of said casing.

3. A valve assembly as defined by claim 1, further comprising a resilient pad on said valve plate for sealing the holes at the underside of said partition.

4. A valve assembly as defined by claim 1, wherein said partition is externally threaded and is removably engaged in an internally threaded portion of said casing, and further comprising a resilient pad on said valve plate for sealing the holes at the underside of said partition.

5. A valve assembly as defined by claim 4, further comprising means on said partition to facilitate turning the partition in the casing.

6. A valve assembly as defined by claim 2, wherein said shaft extends above the top end of said casing, said shaft having transverse upper and lower other holes formed therein and spaced apart axially of the shaft for selectively receiving a transverse rigid bar.

7. A valve assembly as defined by claim 6, further comprising means keying said shaft to the partition so that the shaft moves axially with respect to the partition but is held nonrotatable with respect to the partition, so that turning of the shaft by said bar turns the partition.

8. A valve assembly as defined by claim 6, wherein the lower one of said transverse holes is coplanar with said slots, so that said bar can be slidably disposed in upper portions of said slots to keep said shaft and partition from turning in the casing.

9. A valve assembly as defined by claim 6, further comprising a resilient pad on said valve plate for sealing the first-named holes at the underside of the partition.

10. A valve assembly as defined in claim 1, further comprising a tapered ground joint for sealing holes at the underside of the partition.